Feb. 23, 1965 S. WALLACK 3,171,027
INFRARED ATMOSPHERIC CONTAMINATION DETECTOR SYSTEM WITH
THE DETECTOR INTERRUPTED AT A SUB HARMONIC
FREQUENCY OF THE SOURCE
Filed June 26, 1961
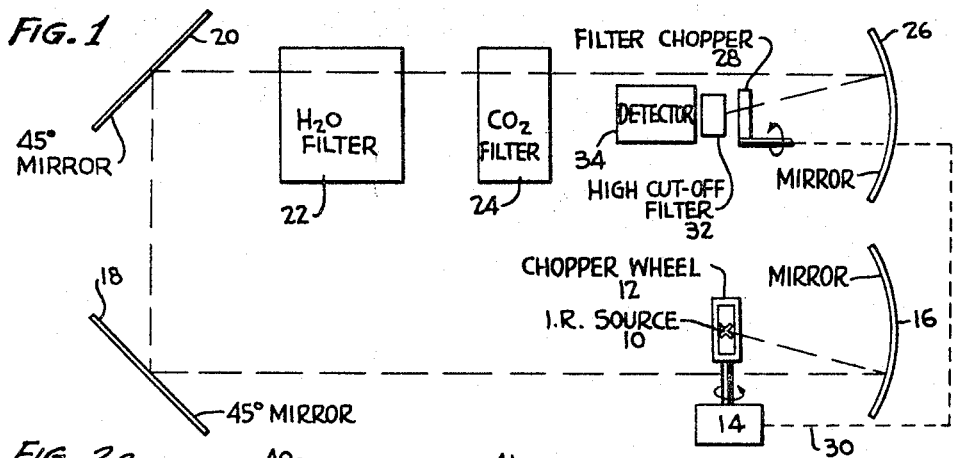
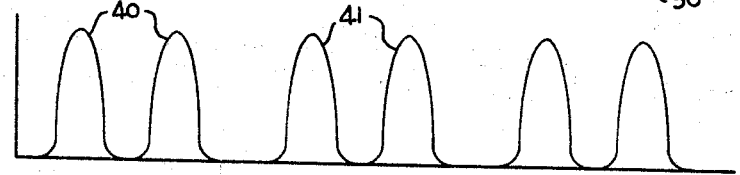
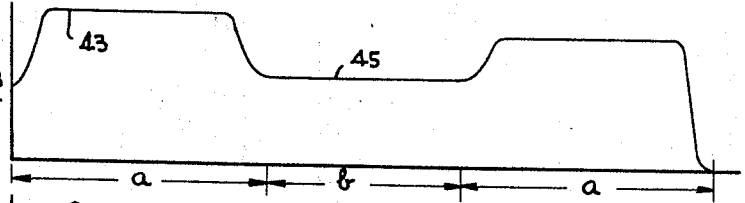
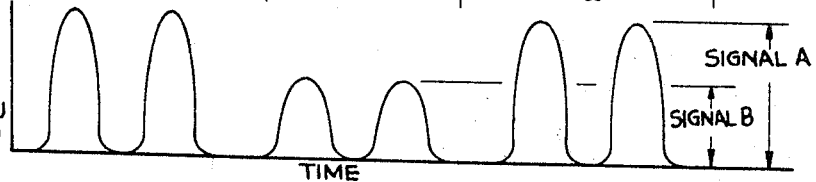
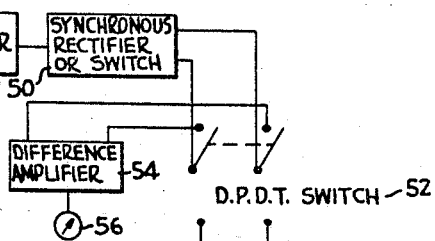
INVENTOR
STANLEY WALLACK
BY Watson, Cole, Grindle & Watson
ATTORNEYS

United States Patent Office 3,171,027
Patented Feb. 23, 1965

3,171,027
INFRARED ATMOSPHERIC CONTAMINATION DETECTOR SYSTEM WITH THE DETECTOR INTERRUPTED AT A SUB-HARMONIC FREQUENCY OF THE SOURCE
Stanley Wallack, 35—11 85th St., Jackson Heights, N.Y.
Filed June 26, 1961, Ser. No. 119,683
6 Claims. (Cl. 250—83.3)

This invention relates to a system for detecting atmospheric contaminants, and more particularly, to a device which is sensitive to specific atmospheric contaminants.

Systems for the detection of specific atmospheric contaminants present a distinct group of problems.

In order to provide a sensitive detector for specific atmospheric contaminants, a reference signal is required to compensate for the presence of other materials, such as dust particles, and to provide for variations in optical alignment. The provision of a reference beam in an open positive-filter system (where a null indicates absence of the atmospheric contaminant) is not feasible, however.

Negative-filter techniques might be used to provide a reference beam. However, there are a number of inherent disadvantages in this type of system. Achieving, and thereafter maintaining, a balance (constant transmission with a filter cell filled with the atmospheric contaminant) is very difficult. Further, the reference beam has only limited utility since the negative-filter technique, which indicates increasing atmospheric contaminant concentration by approaching a null, would not compensate for dust or poor optical alignment.

The optical alignment of a detector system over long optical paths is critical and the system must incorporate some means for compensating for these variations. The utilization of beam-splitting techniques is undesirable since it further increases the alignment problems and adds to the complexity of the system. It is undesirable to use a multiple detector-electronics system because of the problems of obtaining a sensitive balance, and of compensating for the drift inherent in such a system.

In an open system, the usable window regions of the infrared spectrum are quite limited. The wide variety of interfering bands of the atmospheric contaminants limit the choice of wave lengths. According to this invention, the solution of the optical problems entails special filtration so that particular bands of light frequencies are isolated and examined. In the infrared region in which this invention is primarily, but not exclusively, concerned, the cost of band-pass filters is prohibitive and difficult to fabricate. The installation, alignment, and calibration of an atmospheric contaminant detector across a long optical path, which may contain an unknown concentration of atmospheric contaminant, complicates the instrumentation requirements.

Accordingly, it is an object of this invention to provide an improved atmospheric contaminant detecting system.

It is another object of this invention to provide a system for detecting atmospheric contaminants in very low atmospheric concentrations.

It is another object of this invention to provide a system for detecting specific atmospheric contaminants.

It is another object of this invention to provide a system for detecting specific atmospheric contaminants where certain combinations of atmospheric contaminants may be present.

It is another object of this invention to provide an atmospheric contaminant open path detection system which obviates the previously-mentioned disadvantages.

It is a still further object of this invention to provide an atmospheric contaminant detection system in which relatively long optical paths may be employed without incurring the previously-mentioned disadvantages inherent in the prior art systems employing relatively long path lengths.

Briefly, in accordance with aspects of this invention, means are provided for isolating the atmospheric contaminant light band of interest by utilizing a low-pass cutoff filter chopper wheel in combination with an infrared source, a transmitting chopper wheel, and one or more filters. Advantageously, by employing a source chopper which is mechanically synchronized with the filter chopper wheel and driven at a higher frequency than the filter chopper wheel, detection of specific atmospheric contaminants is possible. Since the infrared source is interrupted several times while the filter chopper is in position to reflect light into the detector, several on-off cycles occur each time the 180° chopper filter is fully in the beam and each time it is completely removed. The 180° source chopping filter is preferably fabricated of a material which cuts off below, and as close as possible to, the spectral region of interest of the predetermined atmospheric contaminant which is to be detected. Further, a higher wave length cutoff filter may be positioned in front of the detector to eliminate response to wave lengths far in excess of the spectral region of interest for the specific atmospheric contaminant. Advantageously, water and carbon dioxide filters may be placed in the path of the beam between the source and the detector to eliminate response in these bands. Also advantageously, source chopping and strong collimation in combination with a parabolic mirror system limiting the field of view of the detector, produces a system which is relatively insensitive to background radiation. Advantageously, any detector having spectral response which can be adjusted to preselect the response to a limited spectrum or a limited number of bands, may be employed with this system.

These and various other objects and features of the invention will be more clearly understood from a reading of the detailed description of the invention in conjunction with the drawing, in which:

FIGURE 1 is a combined block and pictoral diagram of one illustrative embodiment of this invention;

FIGURES 2a, b, and c, are time plots of signals at various portions of the system of FIGURE 1; and FIGURE 3 is a combined schematic and block diagram of the electronics portion of the system.

Referring now to FIGURES 1, an infrared source 10 is enclosed in a chopper wheel 12 whch is driven by a motor 14 to interrupt the infrared light transmitted toward parabolic mirror 16. A pair of mirrors 18 and 20 are employed to reflect the resulting infrared beam from the mirror 16 and to direct this beam through a pair of filters 22 and 24. Preferably, these filters are water and carbon dioxide filters. However, they are neither essential to the invention, not is it necessary that they be in this particular order. A second parabolic mirror 26 is positioned in the path of the beam passing through the filters and directs the beam through a filter chopper 28. Advantageously, this filter chopper 28 is driven through a suitable mechanical linkage 30 by motor 14 at a preselected sub-multiple frequnecy of chopper wheel 12. In this particular example, the frequency of chopper 28 is one-half that of chopper 12. Accordingly, two light pulses will be received while the chopper 28 is in each of its two positions relative to filter 32; namely, in and out of the light path. The system further includes a high cutoff filter 32 and a detector 34. Advantageously, any one of a number of types of detectors may be used if they have the required spectral responses. They should have a response in one band common to the absorption band being detected and a response at one or more shortwave lengths which are not common to atmospheric contaminants. There are a number of types of detectors which may fill this requirement, for example, a thermal detector to be used in combination with filters which pass specify bands. Another type of detector is one which comprises a specially sensitized thermistor. Still another type of detector is a gas filled Golay cell. Still another type of detector which may be employed is a pneumatic detector of the condensor microphone type.

A commercial embodiment of this system is described on pages 49 and 50 of Electrical Equipment Engineering of May 1961, in an article entitled "Infrared Detector for Missile Fuel Vapors."

The operation of this system will now be described in conjunction with the wave forms illustrated in FIGURES 2a, b, and c. As best seen in FIGURE 2a, the light pulses of infrared rays reaching the mirror 16 from source 10, will be a series of pairs of pulses, such as pairs 40 and 41, because of the frequency relationship of the choppers. These light pulses are reflected from mirrors 18 and 20, transmitted through filters 22 and 24 to the mirror 26, and are then directed onto filter 32. As previously indicated, filter chopper 28 is synchronized with chopper 12 and turns at a lower frequency than that of chopper wheel 12. Since the source chopping frequency is twice the filter chopping frequency, two complete source chopping cycles occur while the filter is interposed and also while it is removed from the beam. Assuming a constant source, the pulses passed by chopping filter wheel 28 as shown in FIGURE 2b, define a step function. It is to be noted that two complete source chopping cycles occur while the filter 28 is interposed between the detector 34 and the mirror 26 (which causes two light pulses to be transmitted) and also two cycles occur while the filter chopper 28 is removed from the beam. It is also to be noted that the duty cycle of the source chopper is asymmetrical and is so synchronized that the infrared beam is blocked while the filter chopper wheel 28 traverses the beam. The amplitude of signal 43, which is passed while the filter chopper 28 is out of the beam, is a function of all the response bands of the detector. The amplitude of signal 45 represents all the response bands of the detector up to the cutoff of the filter wheel 28. Because of the filter wheel cutoff wave length, only signal 43 will include the atmospheric contaminant absorption band, which is that band of light which is to be detected. When the bands absorbed by normal atmospheric contaminants, such as carbon dioxide and water, are removed by the filters 24 and 22 respectively, the ratio of signal 43 to signal 45 should be constant if none of the atmospheric contaminant under investigation is present. In the event that some of the atmospheric contaminant is present, this ratio will be reduced and the reduction in the ratio will be a measure of the atmospheric contaminant concentration.

It is apparent that this combination of elements incorporates the major advantages of a double beam instrument in a single beam. This is accomplished by providing two separate signals, the smaller of which (signal 45) serves as a reference signal. The ratio of the two signals is a function of the concentration of the atmospheric contaminant and this ratio is reduced as the atmospheric contaminant concentration increases. This ratio will not be affected by intervening particulate matter or by the degree of optical alignment since both signals pass along the identical path. This system is only slightly dependent upon minor variations of source temperature and it is merely necessary to provide a source with a stable power supply. Advantageously, control means may be provided to compensate for the drift or variations in the infrared source. Also advantageously, temperature control means may be provided automatically to stabilize the temperature of infrared source 10.

The electronic instrumentation which may be used in combination with the detector 34 is shown in block and schematic form in FIGURE 3. A preamplifier 46, an amplifier 48, and a synchronous rectifier, or switch, 50, are connected in that order with the detector 34. The synchronous rectifier, or switch, which is synchronized with chopper 28, is employed to isolate or separate the two signals A and B derived from the detector as indicated in FIGURE 2c. These respective signals are fed over separate conductors to a double pole-double throw switch 52. During the initial installation of this system, switch 52 is thrown in its upward position to connect the difference amplifier 54 to the synchronous rectifier 50. The meter 56, which indicates the difference between the two signals A and B, is then observed while the system is aligned optically, until the maximum difference signal is obtained, thereby indicating that the system is aligned.

After alignment is achieved, switch 52 is moved to its downward position, as viewed in FIGURE 3, to connect the two output signals of synchronous rectifier 50 to ratio amplifier 58. The output of amplifier 58 is connected to a meter 60 which may be calibrated to indicate the percentage of atmospheric contaminant, thus giving a direct indication of the concentration of the atmospheric contaminant.

While I have shown and described one illustrative embodiment of this invention, it is understood that the concepts thereof may be applied to other embodiments without departing from the spirit and scope of this invention.

What is claimed is:

1. An atmopsheric contaminant detection system comprising an infrared source, means beaming the energy from said source into a single path, means in said path for periodically interrupting the rays from said source, detector means located in said path including an electrical system for receiving energy from said source and translating same into electrical signals, and a filter chopper movably mounted in said path relative to the path of the rays between said source and said detector means, said filter chopper including means for moving said filter chopper into and out of said path at a sub-harmonic frequency of the frequency of said means for interrupting said source to thereby establish a comparison between signals when said source is and is not transmitted through said path.

2. A device according to claim 1, further comprising a long wavelength cutoff filter positioned in the energy path between said source and said detector means.

3. The system according to claim 2, further comprising filter means positioned between said source and said detector for eliminating erroneous signals resulting from contaminants in the path between said source and said detector means.

4. The device according to claim 3, wherein said filter means comprises an $H_2O$ filter and a $CO_2$ filter.

5. A device according to claim 1, said electrical system further including electrical switching means connected to said detector means and operating in synchronism with said filter chopper, selectively to control the transmission of signals over separate electrical paths in said system according to those signals received when said filter chopper is interposed between said source and said detector means, and those signals received when said filter chopper is removed from the optical path between said source and said detector means.

6. A device according to claim 5, further comprising ratio amplifier means coupled to said switching means for continuously comparing the signals from said switching means.

References Cited in the file of this patent

UNITED STATES PATENTS

| | | |
|---|---|---|
| 2,678,581 | Reisner | May 18, 1954 |
| 2,775,160 | Foskett | Dec. 25, 1956 |
| 2,926,253 | Munday | Feb. 23, 1960 |
| 2,930,893 | Carpenter | Mar. 29, 1960 |
| 2,951,939 | Luft | Sept. 6, 1960 |
| 3,103,586 | Ovrebo | Sept. 10, 1963 |